(12) United States Patent
Aghajan

(10) Patent No.: US 6,912,304 B1
(45) Date of Patent: *Jun. 28, 2005

(54) TWO-DIMENSIONAL SCATTER PLOT TECHNIQUE FOR DEFECT INSPECTION

(75) Inventor: Hamid K. Aghajan, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/365,517

(22) Filed: Aug. 2, 1999

(51) Int. Cl.⁷ .................................................. G06K 9/00
(52) U.S. Cl. ....................... 382/149; 382/151; 382/169
(58) Field of Search ................................ 382/149, 151, 382/173, 181, 216, 294, 170, 152, 145; 348/87, 130, 125, 126, 189; 250/559.2, 559.39; 356/237.5, 237.4, 601, 613, 390; 700/110

(56) References Cited

U.S. PATENT DOCUMENTS

| | | | | |
|---|---|---|---|---|
| 4,511,929 A | * | 4/1985 | Maeda et al. ................ 358/296 |
| 4,783,826 A | * | 11/1988 | Koso .......................... 382/147 |
| 4,823,194 A | * | 4/1989 | Mishima et al. ............ 382/190 |
| 4,886,958 A | * | 12/1989 | Merryman et al. ....... 250/492.2 |
| 5,033,096 A | * | 7/1991 | Morrison et al. ........... 382/152 |
| RE33,894 E | * | 4/1992 | Bradley ....................... 24/10 R |
| 5,291,535 A | * | 3/1994 | Baker et al. .................. 378/22 |
| 5,506,793 A | * | 4/1996 | Straayer et al. ............. 348/125 |
| 5,515,453 A | * | 5/1996 | Hennessey et al. ......... 382/141 |
| 5,568,563 A | * | 10/1996 | Tanaka et al. ............... 382/144 |
| 5,592,236 A | * | 1/1997 | Rosenbaum et al. ........ 348/586 |
| 5,638,465 A | * | 6/1997 | Sano et al. .................. 382/159 |
| 5,808,735 A | * | 9/1998 | Lee et al. ............... 250/559.42 |
| 5,943,441 A | * | 8/1999 | Michael ....................... 382/199 |
| 6,178,257 B1 | * | 1/2001 | Alumot et al. .............. 382/144 |
| 6,252,981 B1 | * | 6/2001 | Guest et al. ................. 382/149 |
| 6,256,093 B1 | * | 7/2001 | Ravid et al. ............. 356/237.2 |
| 6,282,309 B1 | * | 8/2001 | Emery .......................... 382/145 |
| 6,285,397 B1 | * | 9/2001 | Webb et al. ................. 348/189 |
| 6,288,782 B1 | * | 9/2001 | Worster et al. ............. 356/394 |
| 6,512,849 B1 | * | 1/2003 | Yair et al. .................... 382/202 |
| 6,539,106 B1 | * | 3/2003 | Gallarda et al. ............ 382/149 |

OTHER PUBLICATIONS

Hanaizumi, H. et al.: "An Automatic Registration Method For Remotely Sensed Multispectral Images By Using Spatial Correlation Between Local Triangles" Proceedings of the International Geoscience and Remote Sensing Symposium. (IGARSS), US, New York, IEEE, vol. SYMP. 12, Jul. 10, 1989, pp. 1287–1290, XP000139269.

\* cited by examiner

*Primary Examiner*—Yon J. Couso
(74) *Attorney, Agent, or Firm*—Blakely, Sokoloff, Taylor & Zafman

(57) ABSTRACT

A method and associated apparatus for relating a test image with a reference image in an automated image processing system is disclosed. The test and reference images are aligned. A two-dimensional scatter plot is then created by plotting the gray level of a test image pixel against the gray level of a corresponding reference image pixel for each aligned pixel location.

6 Claims, 10 Drawing Sheets

TWO-DIMENSIONAL SCATTER PLOT TECHNIQUE FOR DEFECT INSPECTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(e).

BACKGROUND OF THE INVENTION

1. Field of the Invention

This invention generally relates to digital image processing and, more particularly, to systems and methods for detecting defects in a semiconductor device using image comparison techniques.

2. Description of the Related Art

Image comparison techniques are used to detect defects in a semiconductor wafer. Typically, a test image is acquired and then compared to a reference image. A defect-detection algorithm is then used to detect variations between the images and to determine whether such variations are real defects. In the so-called random-logic inspection mode, an image of a first die is acquired and then compared to the image of a second die in the same wafer. Array-inspection mode is similarly performed except that a section of a die is compared to another section in the same die having an identical structure. Array-inspection mode is used, for example, in testing devices with repeating structures such as memory cells. In lieu of comparing images from a wafer being tested, defects may also be detected by comparing an acquired test image with a known good image from a database.

FIG. 1 illustrates a defect-detection method in the prior art. A test image and a reference image of the wafer feature being analyzed are acquired from different sections of the wafer using, for example, conventional electron-beam imaging techniques (step 110). Each image comprises a plurality of pixels, with each pixel being defined by its location within the image and its intensity or gray level. The use of gray levels in image processing is known in the art and is described in R. C. Gonzales and R. E. Woods, "Digital Image Processing," Addison-Wesley (1992), e.g. pages 6–7, which is incorporated herein by reference in its entirety. The two images are then aligned pixel-by-pixel such that each feature in the test image matches up with the corresponding feature in the reference image (step 120). A difference image is then generated by subtracting the gray levels of the two images (step 130). Because matching pixels with identical gray levels will be subtracted out, the difference image represents pixel gray level variations between the reference image and the test image. The gray level of each pixel in the difference image is scaled, normalized, and then plotted in a one dimensional histogram such as histogram 200 shown in FIG. 2 (step 140). Histogram 200 plots the number of pixels in the difference image having a specific gray level. For instance, histogram 200 indicates that there are 20,000 pixels in the difference image having a gray level of 50.

A pixel from the test image can be different from a corresponding pixel in the reference image even if there are no defects in the two images. Intensity variations can be caused by, for example, differences in the physical layer structures, noise in the image acquisition electronics and signal paths, and varying noise modulation level within a single image across different gray levels. Thus, pixels in the difference image do not necessarily indicate that a defect exists. To differentiate real defects from false or "nuisance" defects, each pixel in the difference image is compared to a threshold window (FIG. 1, step 150). Pixels with a gray level outside the threshold window are declared defects. For example, if the threshold window is ±50 and a pixel in the difference image has a gray level of 60 (i.e. the gray levels of the test and reference images differ by 60 units), a defect event is declared (FIG. 1, step 160). The defect event is then verified by an operator to ensure that the die is indeed defective before the die is discarded in subsequent processing.

Finding the optimum threshold value for a given test image is an important but imprecise task. The threshold value must be chosen such that real defects are detected while differentiating nuisance defects. The narrower the threshold value, the more nuisance defects will be declared. Nuisance defects adversely affect production throughput because each defect event must be checked and verified. On the other hand, widening the threshold window will reduce nuisance defect events at the expense of letting real defects go undetected. Thus, a method for evaluating the effectiveness of a threshold or thresholding scheme is highly desirable.

SUMMARY

The invention provides for a method and associated apparatus for relating a test image with a reference image. In an embodiment of the invention, the test and reference images are aligned. A two-dimensional scatter plot is then created by plotting the gray level of a test image pixel against the gray level of a corresponding reference image pixel for each aligned pixel location. The invention is applicable to electron-beam, bright-field, dark-field, laser, and atomic-force microscopy ("AFM") inspection systems.

DETAILED DESCRIPTION

The present invention provides for a method and associated apparatus for relating the pixel of a test image with the corresponding pixel on a reference image. The invention can be used in determining the effectiveness of a threshold or thresholding scheme. The invention is also useful in other image processing applications such as those disclosed by the same inventor in the related co-pending U.S. patent application Ser. No. 09/365,503 filed Aug. 2, 1999, "Adaptive Mask Technique For Defect Inspection," which is incorporated herein by reference in its entirety. Other uses for the invention are in electron-beam, bright-field, dark-field, laser, and atomic-force microscopy ("AFM") inspection systems.

Figure 1:
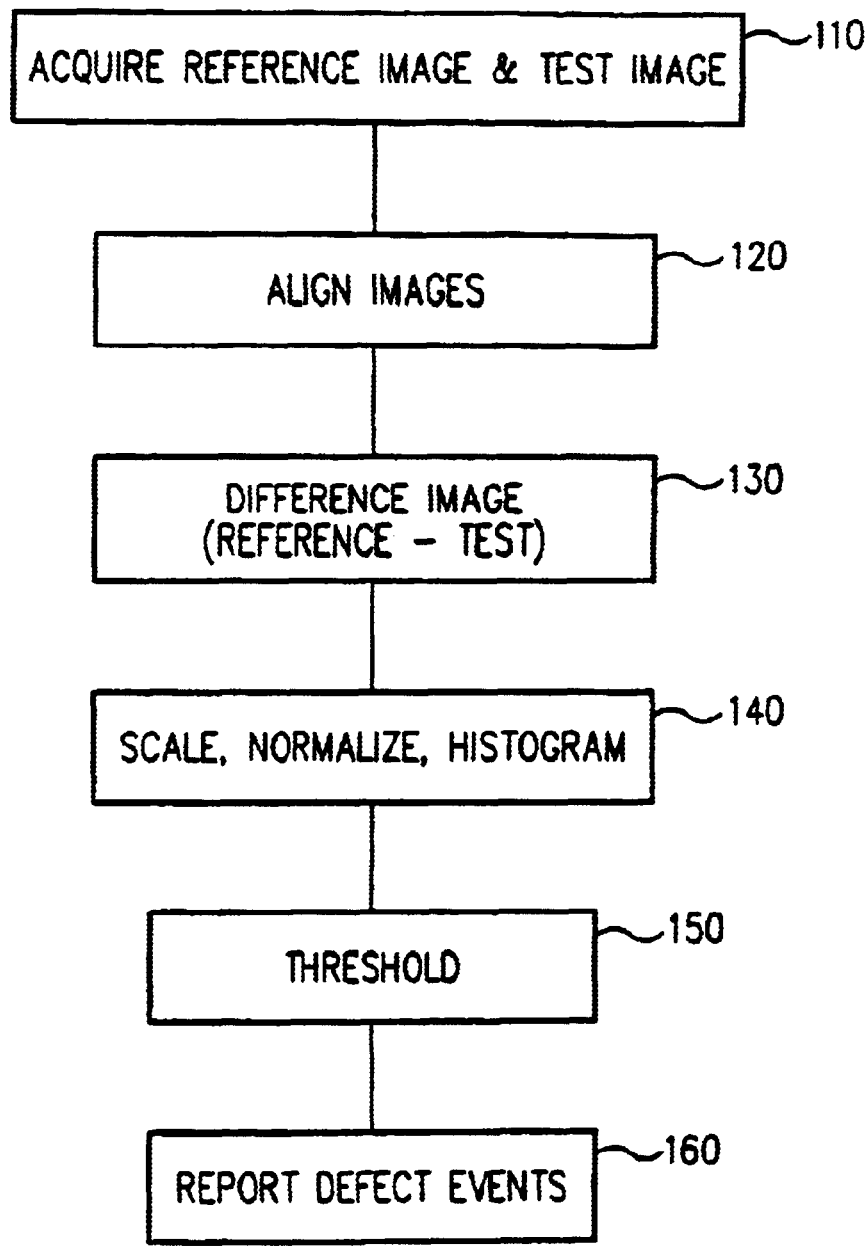
FIG. 1 shows a defect detection method in the prior art.
Figure 2:
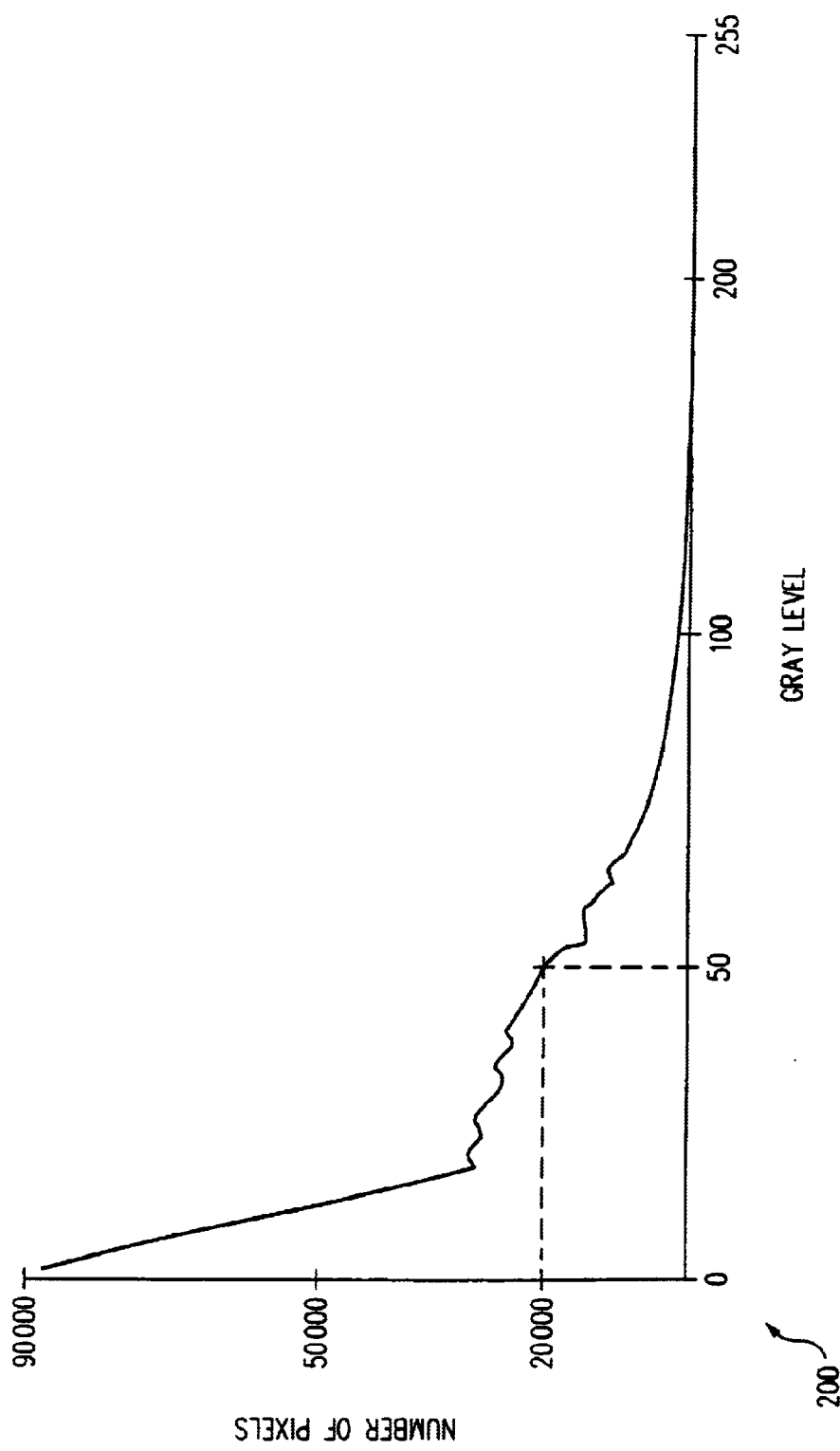
FIG. 2 shows a one-dimensional histogram plot of gray levels.
Figure 3:
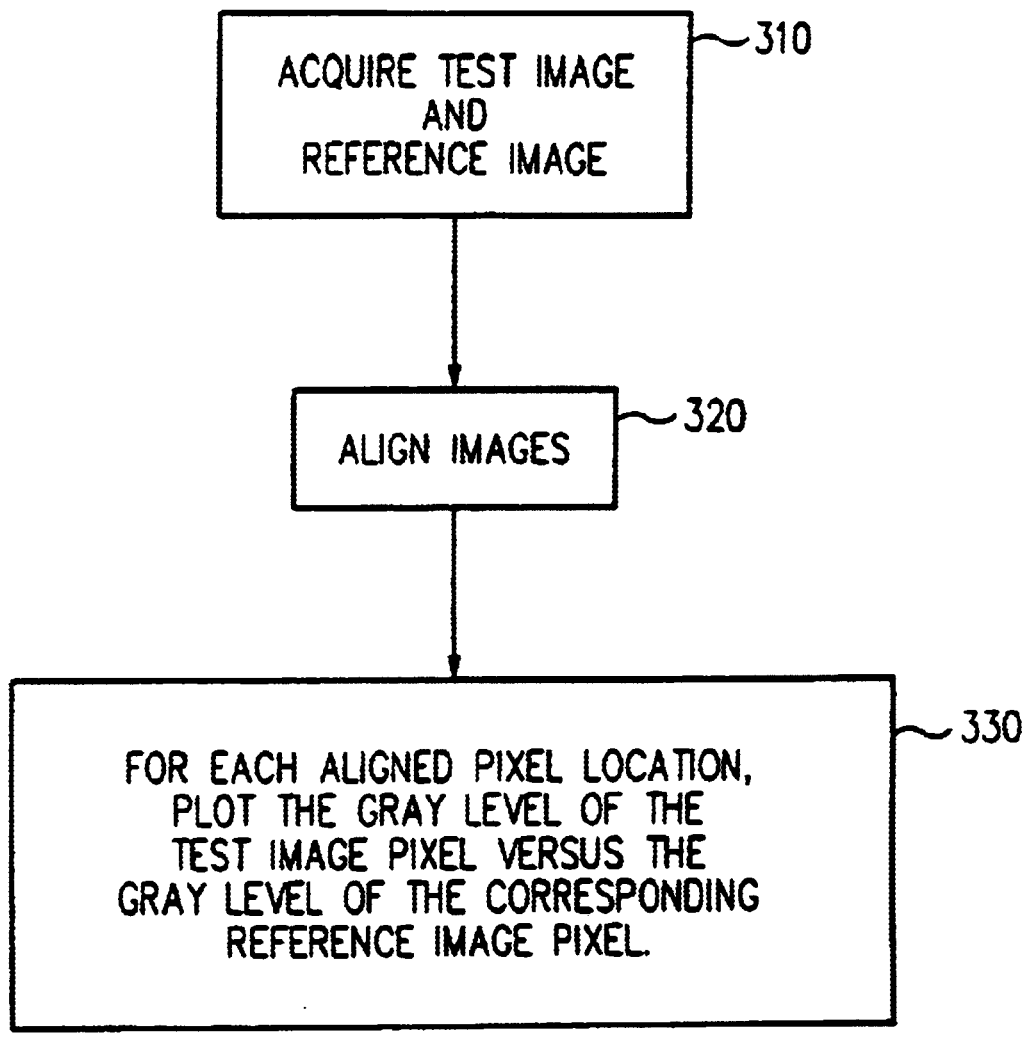
FIG. 3 shows the steps of an embodiment of the present invention.

FIG. 3. illustrates the steps of an embodiment of the present invention. In step 310, a test image and a reference image of, for example, semiconductor structures are acquired using conventional image acquisition techniques. The images can also be acquired using the step-and-image acquisition system disclosed in commonly-owned U.S. patent application Ser. No. 09/226,967, "Detection of Defects In Patterned Substrates," filed Jan. 8, 1999, which is incorporated herein by reference in its entirety.

In step 320, the test and reference images are aligned to match up corresponding pixels between the two images. A variety of alignment techniques can be used with the present invention including the technique disclosed in commonly-owned U.S. patent application Ser. No. 09/227,747, "Feature-Based Defect Detection," filed Jan. 8, 1999, which is incorporated herein by reference in its entirety.

Figure 4A:
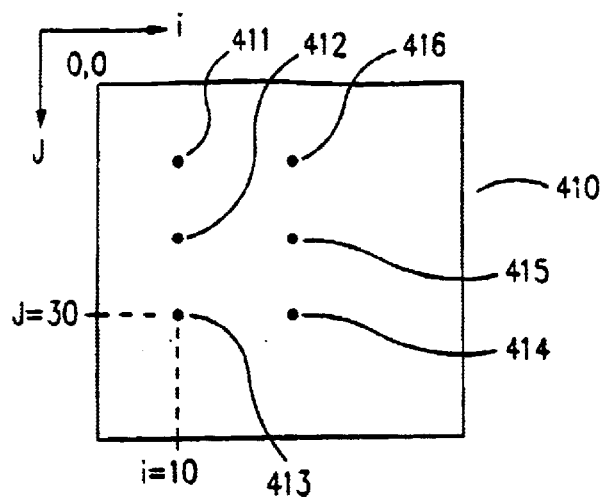
FIGS. 4A–4c show an alignment step in accordance with the present invention.
Figure 4B:
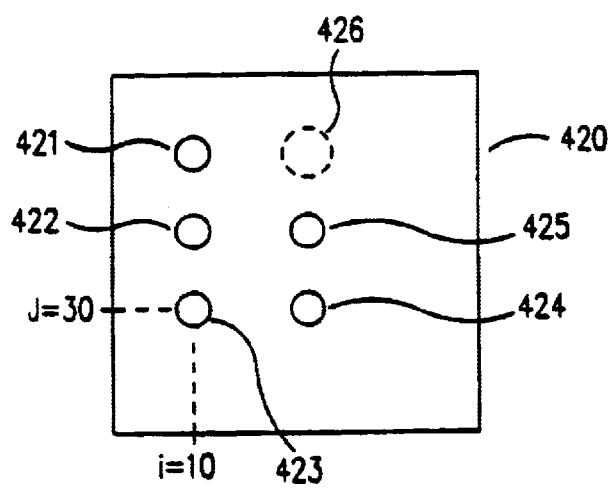
Figure 4C:
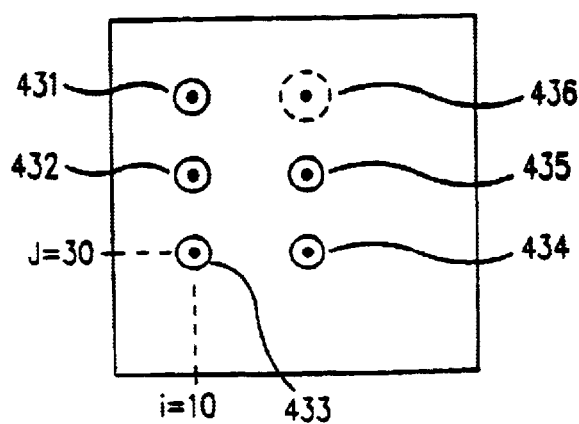

Step 320 is further illustrated in FIGS. 4A–4C. FIG. 4A shows a test image 410 comprising pixels 411–416. Each pixel is defined by its gray level and its location on the image. As an example, pixel 413 is on location i=10 and j=30 (i.e. (10, 30)). The gray level of pixel 413 is 50 for purposes of this illustration. Table 1 provides the coordinate location and gray level for each pixel of test image 410 while Table 2 provides the same information for pixels 421–426 of reference image 420 (FIG. 4B).

TABLE 1

| Pixel | Location (i, j) | Gray Level |
|---|---|---|
| 411 | (10, 10) | 100 |
| 412 | (10, 20) | 150 |
| 413 | (10, 30) | 50 |
| 414 | (20, 30) | 180 |
| 415 | (20, 20) | 200 |
| 416 | (20, 10) | 250 |

TABLE 2

| Pixel | Location (i, j) | Gray Level |
|---|---|---|
| 421 | (10, 10) | 100 |
| 422 | (10, 20) | 150 |
| 423 | (10, 30) | 50 |
| 424 | (20, 30) | 150 |
| 425 | (20, 20) | 100 |
| 426 | (20, 10) | 0 |

FIG. 4C graphically shows the alignment of test image 410 with reference image 420. Aligned pixel location 431 comprises the pixels 411 and 421, aligned pixel location 432 comprises the pixels 412 and 422, and so on.

Figure 5A:
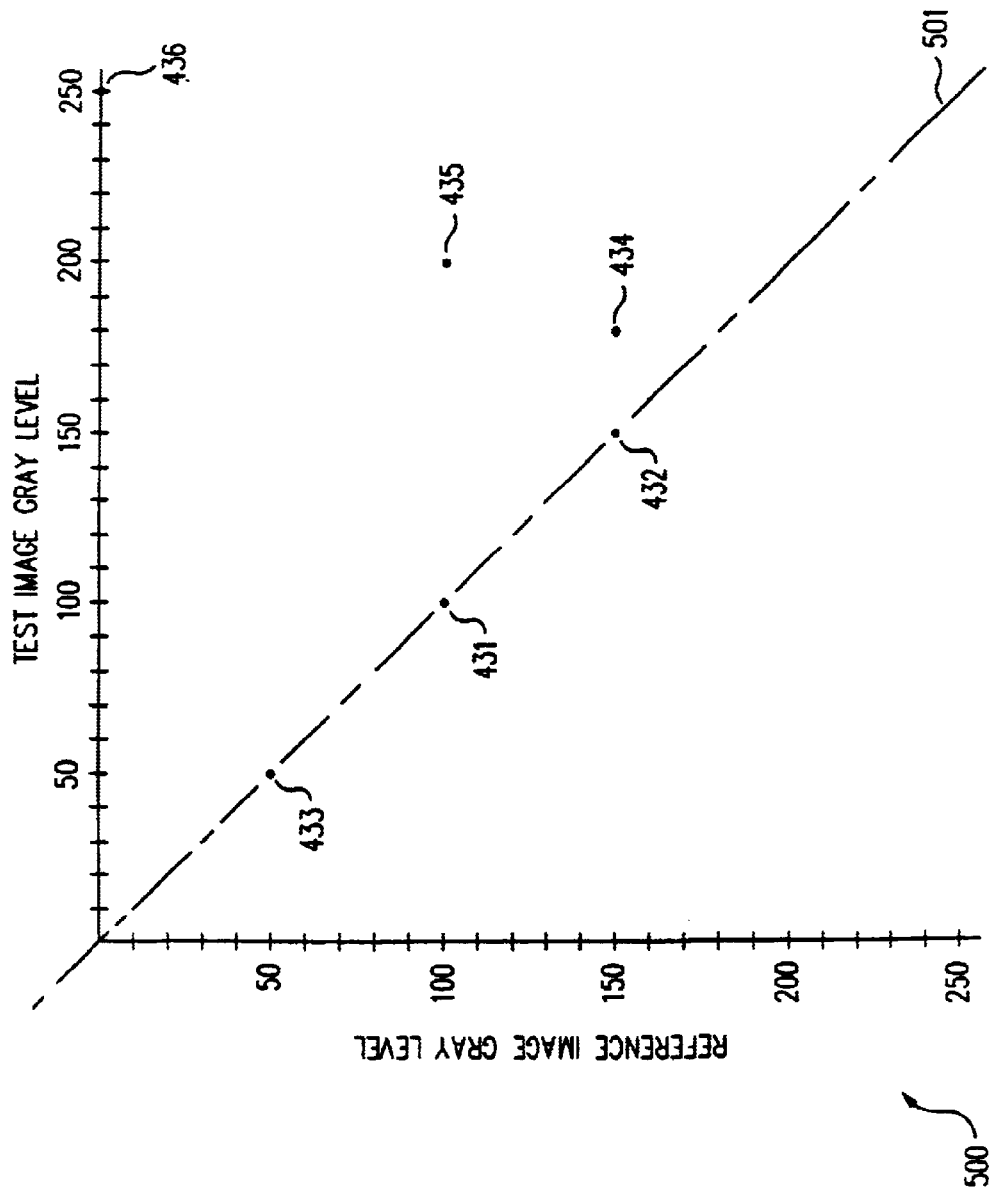
FIGS. 5A–5B show a two-dimensional scatter plot in accordance with the present invention.

Once the reference and test images are aligned, the pixel-to-pixel correspondence between the test image and the reference image is known. For each aligned pixel location, the gray level of a pixel from the test image is plotted against the gray level of the corresponding pixel in the reference image (FIG. 3, step 330). Using FIG. 4C as an example, the gray level of pixel 411 is plotted against the gray level of pixel 421, the gray level of pixel 412 is plotted against the gray level of pixel 422, and so on. Using step 330 for locations 431–436 yields the data points shown in Table 3. The resulting two-dimensional scatter plot 500 is shown in FIG. 5A.

TABLE 3

| Location | Test Image Gray Level | Reference Image Gray Level |
|---|---|---|
| 431 | 100 | 100 |
| 432 | 150 | 150 |
| 433 | 50 | 50 |
| 434 | 180 | 150 |
| 435 | 200 | 100 |
| 436 | 250 | 0 |

Table 3 shows that locations 434, 435, and 436 have varying gray levels and, thus, indicate the presence of possible defects. Locations 431, 432, and 433 are free of defects because the test image and the reference image have the same gray levels in said location. Scatter plot 500 (FIG. 5A) provides information as to the presence of possible defects. All aligned pixel locations with the same gray levels can be represented in scatter plot 500 by an imaginary line 501 (FIG. 5A). The slope of imaginary line 501 is +1 because it represents the aligned pixel locations wherein the gray level of the test image pixel is the same as the gray level of the corresponding pixel in the reference image. All aligned pixel locations with varying gray level values will lie away from imaginary line 501. The further a location is plotted away from line 501, the greater the deviation in gray levels, and the higher the chance that a defect exists in that location. In scatter plot 500, locations 434, 435, and 436 are not on imaginary line 501 and indicate the presence of possible defects.

Figure 5B:
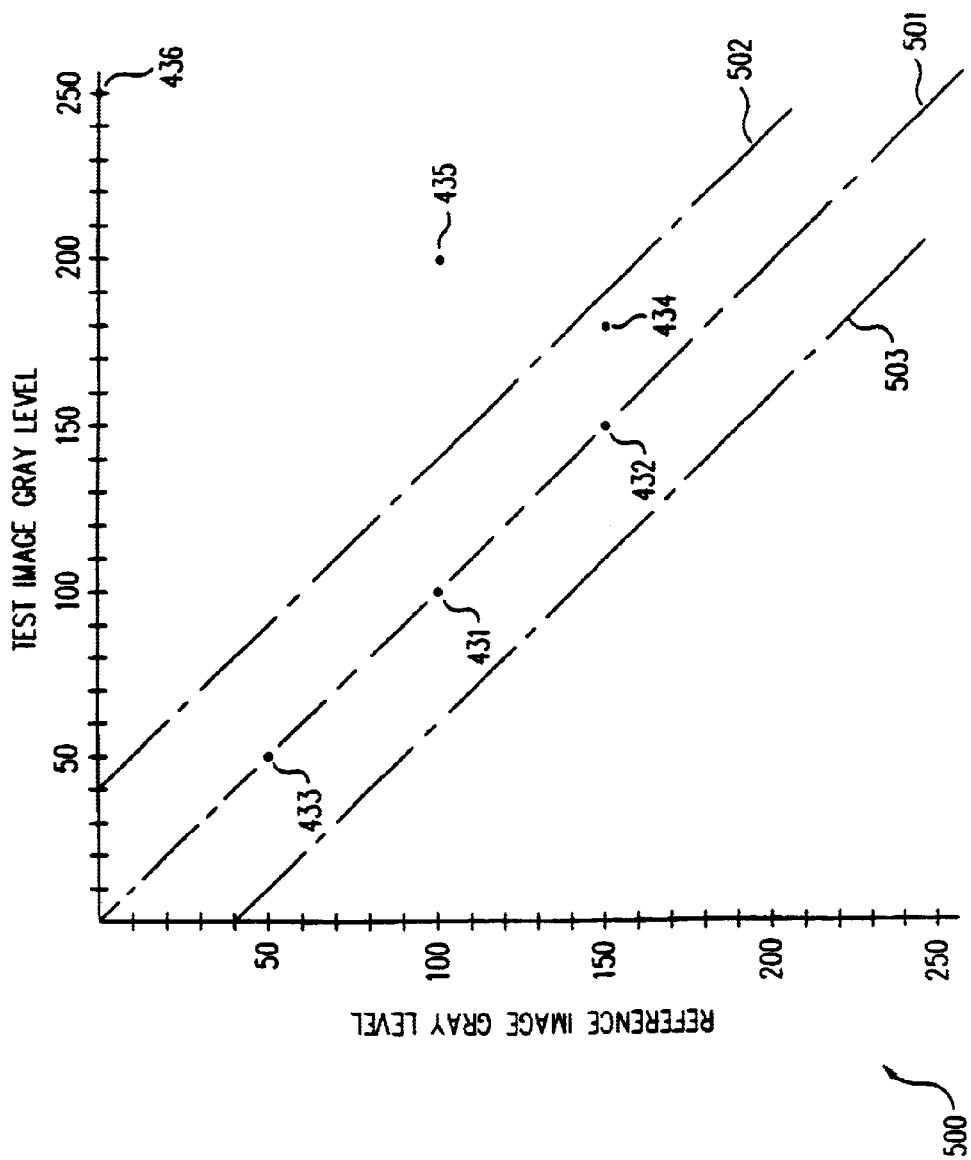

Scatter plot 500 may be used to evaluate the effectiveness of a threshold or thresholding scheme. For example, a threshold window of ±40 gray level units may be plotted and superimposed on scatter plot 500 as shown by lines 502 and 503 in FIG. 5B. Line 502 represents all aligned pixel locations wherein the gray level of the test image is greater than the gray level of the reference image by 40 units. Similarly, line 503 represents aligned pixel locations wherein the gray level of the reference image is greater than that of the test image by 40 units. Aligned pixel locations outside lines 502 and 503, such as locations 435 and 436, will be declared as defect events. In FIG. 5B, locations 431, 432, 433, and 434 will not trigger a defect event because said locations are within the threshold window. Different threshold windows can be plotted and superimposed on scatter plot 500 to determine which aligned pixel locations will be "captured" and declared as a defect event. Threshold windows may be generated using equations for shapes other than parallel lines. This capability to visualize the extent of a threshold window is particularly useful to the skilled artisan in determining an appropriate threshold during test development.

A pseudo code for implementing an embodiment of the invention in computer software is shown below. In the pseudo code, the gray level values are plotted in a memory array variable ("Scatter"). Appendix A lists the source code of a function written in the C programming language. On page 2 of Appendix A, "hist2D8" creates a two-dimensional scatter plot in accordance with the present invention. The code would be executed by a computer or processor which is conventionally coupled to or a part of a defect inspection system. Of course, such a system would typically store this source code and the resulting plots in a computer-readable medium (memory).

```
/* PSEUDO CODE FOR CREATING A 2D SCATTER PLOT */
Acquire Reference Image;
Acquire Test Image;
Align Test Image to Reference Image;
Create a 256 x 256 Image named Scatter;
Initialize Scatter to 0;
Do for i = 1 to NumRows
{
    Do for j = 1 to NumCols
    {
        p1 = Reference(i,j);
        p2 = Test(i,j);
        Scatter(p2,p1) = 1;
    }
}
Plot Scatter as an Image;
/* END OF PSEUDO CODE */
```

Figure 6:
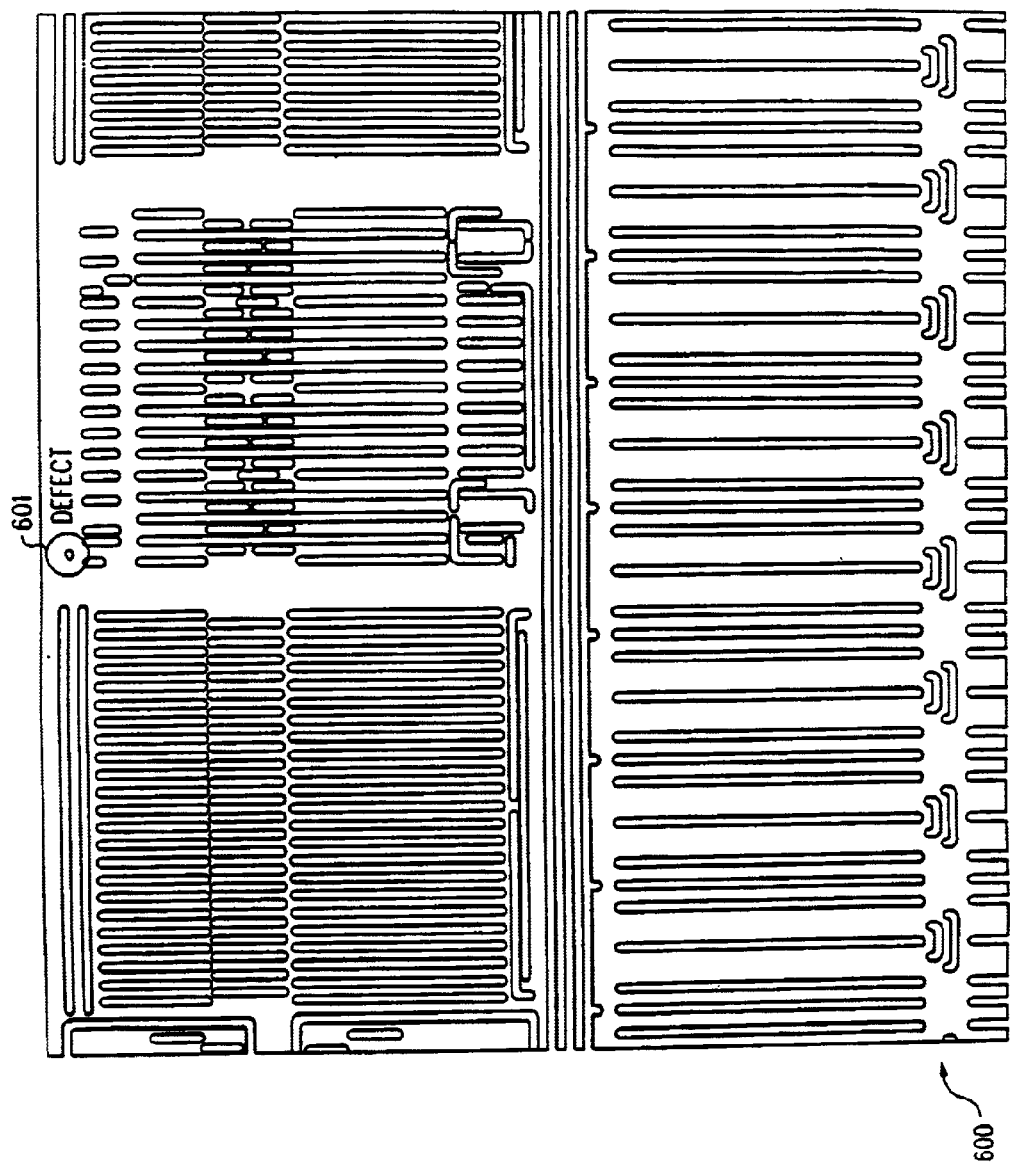
FIGS. 6–7 show a test image and a reference image, respectively, taken from a device wafer.
Figure 7:
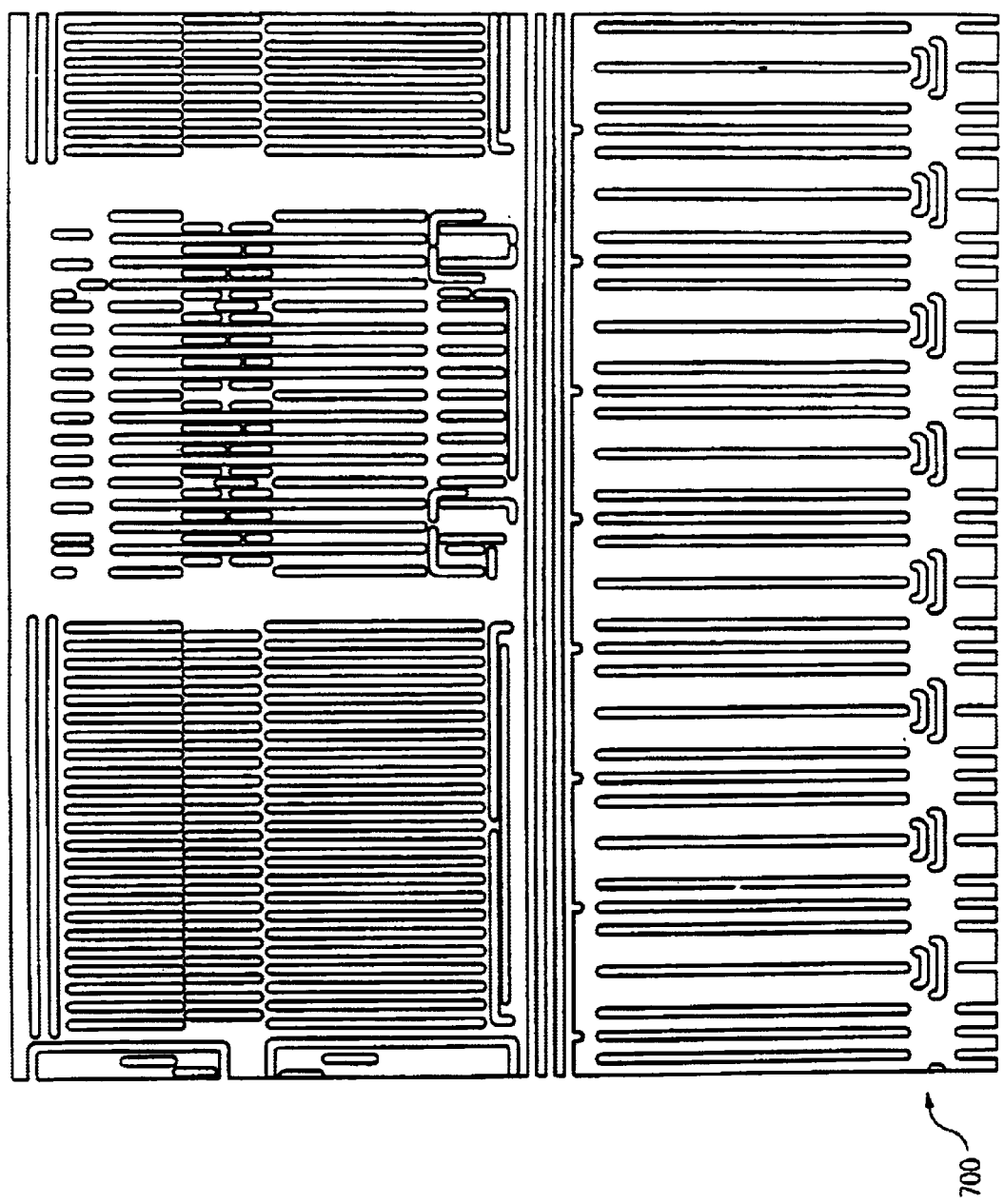
Figure 8:
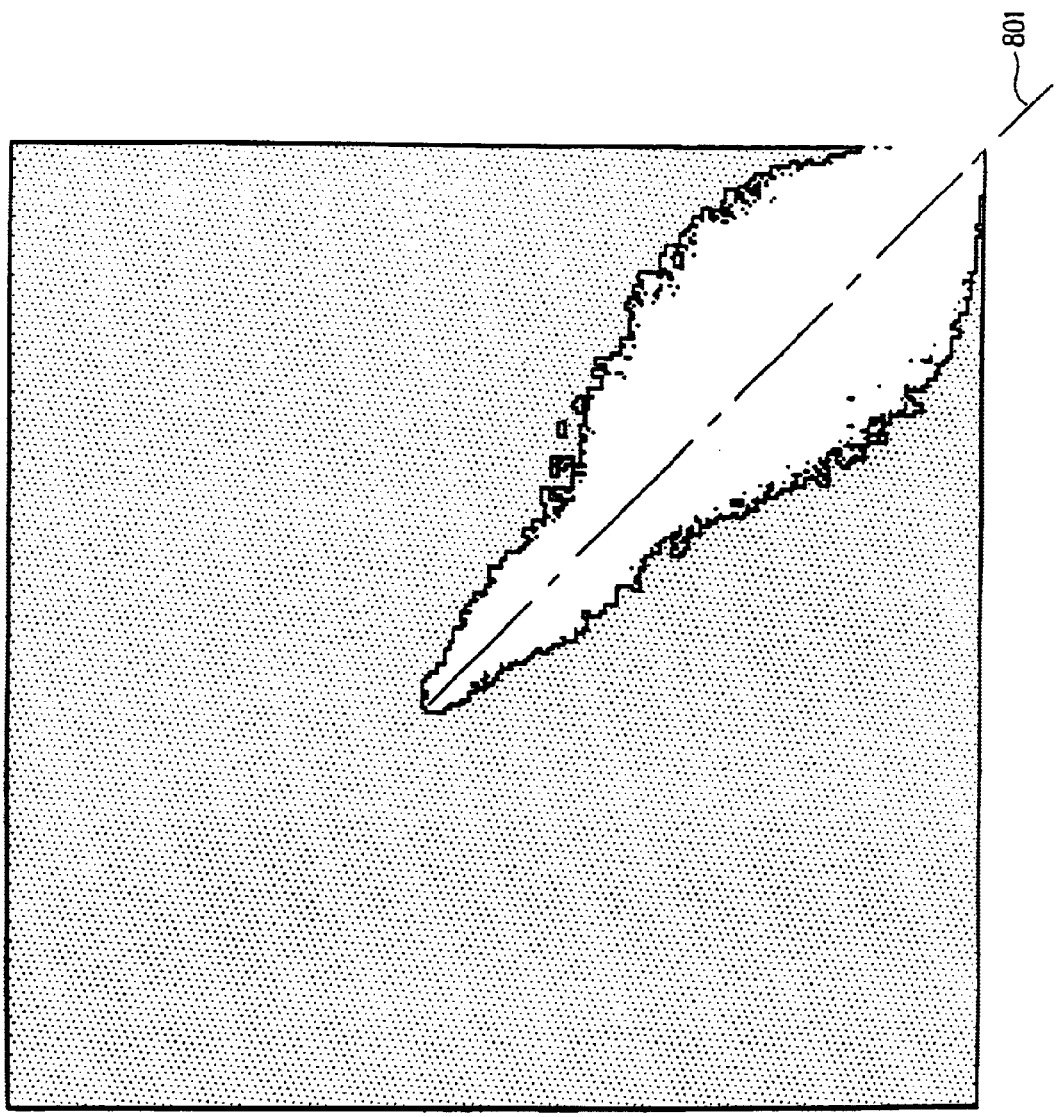
FIGS. 8–9 show a two-dimensional scatter plot in accordance with the present invention.
Figure 9:
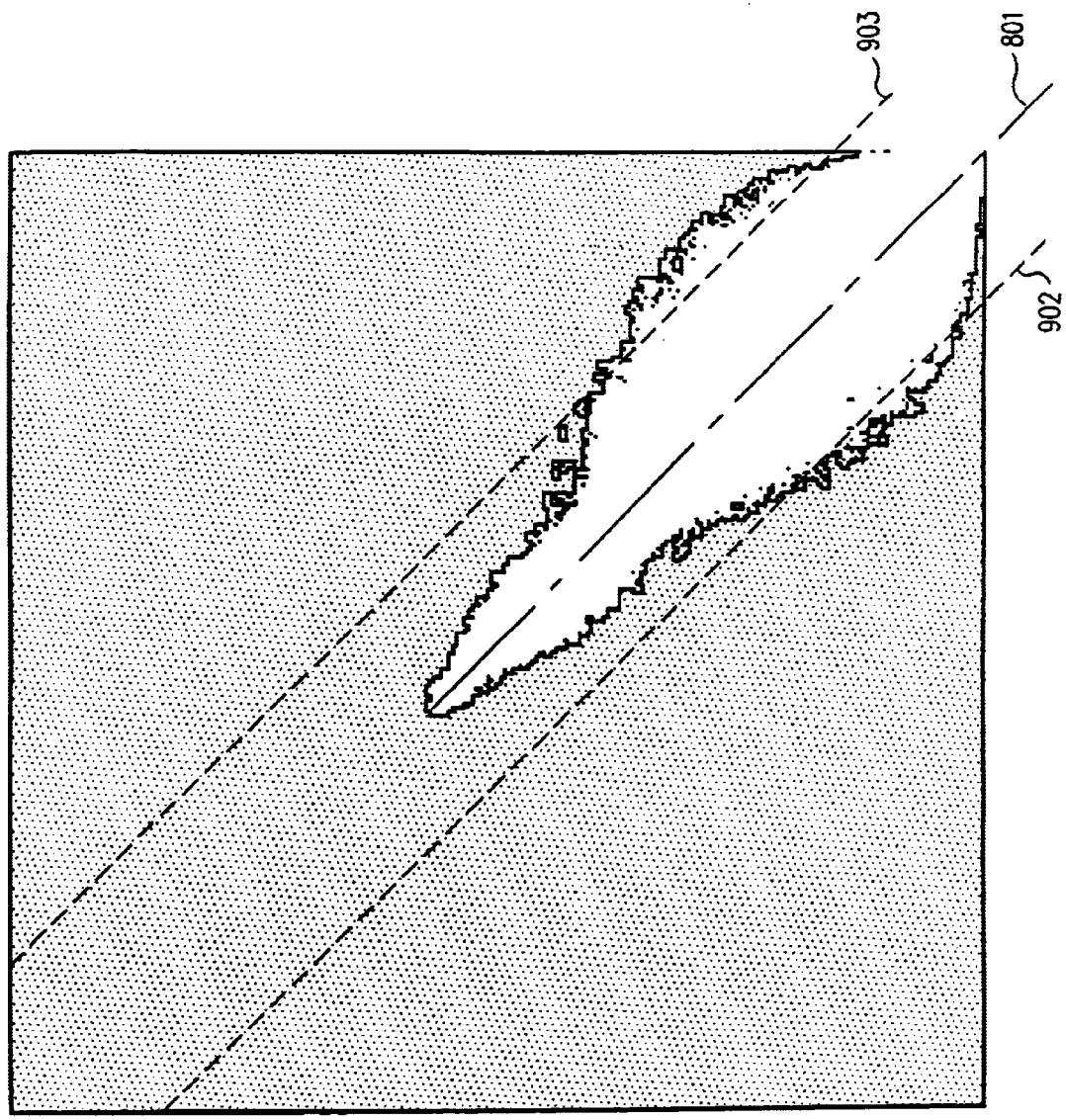

FIGS. 6–9 pictorially summarize an embodiment of the present invention. FIG. 6 shows a test image 600 acquired conventionally from a wafer having a defect 601. A reference image 700 (FIG. 7) is similarly acquired and then aligned (not shown) with test image 600. Two-dimensional scatter plot 800 is generated by plotting the gray level of the test image pixel against the gray level of the corresponding reference image pixel for each aligned location (FIG. 8). The scatter plot may be generated manually or by using a programmed computer. Aligned pixel locations are plotted as white dots in a dark background. In FIG. 8, line 801 defines the aligned pixel locations wherein the gray level of the test and reference image pixels are identical. For example, if test image 600 was identical to reference image 700, all points in scatter plot 800 would lie on line 801. To determine the extent of a threshold, the equation or parameters defining the threshold are plotted and shown in FIG. 9 as lines 901 and 902. Points outside lines 901 and 902 will be declared as defect events.

It is to be understood that the description given above is for purposes of illustration and is not intended to be limiting. Numerous variations are possible without deviating from the scope and spirit of the invention. The invention is set forth in the following claims.

What is claimed is:

1. In an image processing system, a method for relating a first image to a second image comprising:

a) aligning the first image with a second image;

b) plotting a gray level of a pixel from the first image against a gray level of a corresponding pixel from the second image for all aligned pixel locations; and c) plotting at least a threshold window on a plot created in step (b), wherein an area outside the threshold window indicates a possible defect.

2. The method of claim 1 wherein a plot created in (b) is stored in a memory array variable.

3. The method of claim 1 wherein a plot created in step (b) is displayed on a video monitor.

4. A computer-readable medium storing a program for carrying out the method of claim 1.

5. A computer-readable medium comprising:

a plurality of memory locations storing data representing a first image and an associated second image, said first and second images each having a plurality of pixels with each pixel being defined by a location coordinate and a gray level; and, an array comprising a plurality of memory locations storing data representing a plot of the gray levels of pixels from the first image against the gray levels of corresponding pixels from the second image.

6. A defect inspection system comprising:

a) an image, acquisition unit being operable to acquire a first image and an associated second image the first and second images each having a plurality of pixels with each pixel being defined by a location coordinate and a gray level;

b) a plurality memory locations storing data representing the first image and the second image; and, c) a processor being operable to plot the gray levels of pixels from the first image against the gray levels of corresponding pixels from the second image.

* * * * *